(12) United States Patent
Knight et al.

(10) Patent No.: US 11,421,972 B2
(45) Date of Patent: Aug. 23, 2022

(54) DUAL COIL INDUCTIVE ENERGY GENERATOR

(71) Applicant: U.S. Army Combat Capabilities Development Command, Army Research Labortary, Adelphi, MD (US)

(72) Inventors: Ryan R. Knight, Bethesda, MD (US); Robert H. Wood, Laurel, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 19 days.

(21) Appl. No.: 16/881,033

(22) Filed: May 22, 2020

(65) Prior Publication Data

US 2021/0364263 A1  Nov. 25, 2021

(51) Int. Cl.
*F42C 11/04* (2006.01)
*H02K 35/02* (2006.01)

(52) U.S. Cl.
CPC .............. *F42C 11/04* (2013.01); *H02K 35/02* (2013.01)

(58) Field of Classification Search
USPC .......................................................... 102/209
See application file for complete search history.

(56) References Cited

U.S. PATENT DOCUMENTS

| | | | |
|---|---|---|---|
| 3,034,437 A | 5/1962 | Schermer et al. | |
| 3,981,245 A | 9/1976 | Buzzell et al. | |
| 4,091,733 A | 5/1978 | Ziemba | |
| 5,818,132 A * | 10/1998 | Konotchick | H02K 35/02 310/17 |
| 8,887,640 B1 | 11/2014 | Knight et al. | |
| 2008/0115686 A1 | 5/2008 | Crist et al. | |

FOREIGN PATENT DOCUMENTS

| | | | | |
|---|---|---|---|---|
| JP | 3163956 U | * | 11/2010 | ............. H02K 35/02 |
| WO | WO-2016054058 A1 | * | 4/2016 | ............. H02K 35/02 |

\* cited by examiner

*Primary Examiner* — Reginald S Tillman, Jr.
(74) *Attorney, Agent, or Firm* — Alan I. Kalb

(57) ABSTRACT

Apparatus for generating energy and a method of operating the apparatus to generate energy, where the apparatus comprises a coil assembly of a pair of coils circumscribing a magnet assembly that is held in a first position until, upon an acceleration event, the magnet moves from the first position to a second position, which imparts inductive energy into the coils.

2 Claims, 6 Drawing Sheets

DUAL COIL INDUCTIVE ENERGY GENERATOR

GOVERNMENT INTEREST

The invention described herein may be manufactured, used and licensed by or for the U.S. Government.

BACKGROUND

Field

Embodiments of the present invention generally relate to the field of energy generating power sources and, more specifically, to a dual coil inductive energy generator configured to produce energy upon the generator being accelerated.

Description of the Related Art

There are three types of energy generating power sources for fuzing and guidance of munitions: thermal batteries, reserve batteries, and generators that produce energy in response to acceleration of the munition, also known as setback generators. These power sources must conform to stringent environmental requirements and be able to function after a 10-20 year of storage. The long storage requirements coupled with a requirement where the fuze cannot be electrically powered until its mission, eliminates the use of high energy density lithium polymer (or similar) commercial off the shelf (COTS) batteries. Furthermore, munition power sources must be able to operate within a large temperature range of −45 to 145° F. [1]. COTS battery electrolyte chemistry struggle to meet the −45° F. operating temperature and struggle to meet long term storage Setback generators (SBG) transduce gun launch acceleration energy into a stored electrical energy. Typically, this energy is either transduced by magnetic or piezoelectric materials. For magnetic transduction under gun-launch, a magnet is initially isolated by a displacement limiting feature (e.g., a shear disc). This feature keeps the SBG from activating during handling, especially, if dropped. Once a critical acceleration value is reached, the displacement limiting feature is removed or ruptured and the magnet displaces relative to a coil to inductively generate energy. Similarly, a piezoelectric crystal is isolated from a proof-mass and once a threshold acceleration is reached the piezo-element is compressed to produce energy.

Since the advent of SBGs, fuzing has progressed from simply impact detonation to sophisticated techniques such as: time delay detonation, radio frequency proximity detonation, delayed impact point detonation, and, more recently, the ability to navigate the munition to a target. Many other advancements have been made in smart fuzing while munitions guidance and smart sensing continues to advance.

The more sophisticated munitions become, the larger the energy budget and requirements become. SBGs will never be able to meet the energy densities of thermal and reserve batteries; however, there is a growing demand for them in small- to medium caliber munitions where volume needs to be minimized. Small- to medium-caliber munitions operate for short durations, need to be completely energized after muzzle exit, and typically don't require as much electrical power as large-caliber munitions. SBGs have been demonstrated to fully power a 40 mm Mk19 MEMS safe and arm fuze that has point and timeout detonation capability. The energy necessary for operating such a munition is 4 mJ. The limit for SBG energy generation of currently available SBGs is about 5 mJ.

Advanced small- to medium caliber munitions presently require more energy than the typical SBG can produce. As such, there is a need for an SBG that can produce a substantial amount of energy, i.e., greater than 5 mJ of energy.

SUMMARY

Embodiments of the present invention include apparatus for generating energy comprising a coil assembly of a pair of coils circumscribing a magnet assembly that is held in a first position until, upon an acceleration event, the magnet moves from the first position to a second position, which imparts inductive energy into the coils. In one embodiment, the coils are connected in series as a coupled pair and, in another embodiment, the coils are independent and connected in parallel. Embodiments additionally include a method of operation of the apparatus to generate energy.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5A depicts the magnet assembly retained in a first position, FIG. 5B depicts the magnet assembly located in a second position, FIG. 5C depicts a schematic diagram of the external circuit that stores the energy generated by movement of the magnet assembly for the first position in FIG. 5A to the second position in FIG. 5B;

DETAILED DESCRIPTION

Embodiments of the invention include an inductive energy generator comprising a pair of serial or parallel connected coils circumscribing a magnet. The coils may be counter wound (i.e., each coil is wound in an opposite direction) or wound in the same direction. A retainer, such as a shear disc, holds the magnet in a first position until, upon an acceleration event, the retainer releases the magnet, and the magnet moves from the first position to a second position. As the magnet travels parallel to the center access of the generator through the coils, the magnet imparts a magnetic field upon the coil pair to produce inductive energy within the coils. The inductive energy can be coupled from the coils to power electronics that are external to the inductive setback generator. In one embodiment, the energy generated by the generator is typically stored in at least one capacitor located external to the generator. Such electronics comprise fuze and guidance electronics for munitions, circuits for vehicle crash detection and recording, impact detection and the like. The dual coil inductive energy generator may also find use in any apparatus that experiences high acceleration or deacceleration, including toys that light or otherwise operate upon impact.

Figure 1:
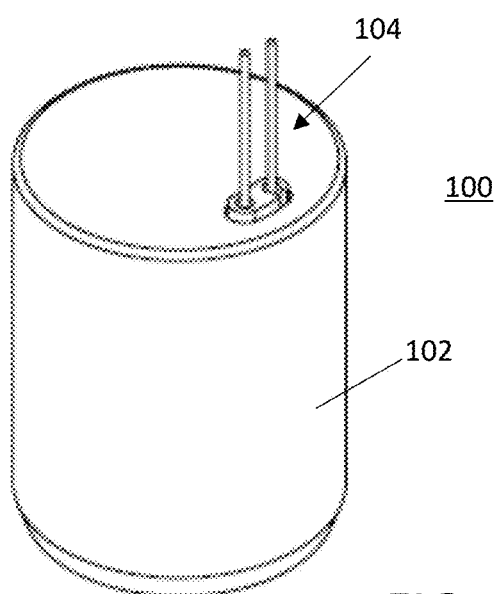
FIG. 1 depicts a perspective view of one embodiment of a dual coil inductive energy generator (also known as a setback generator (SBG)) in accordance with one embodiment of the invention.

FIG. 1 depicts a perspective view of an inductive setback generator 100 in accordance with one embodiment of the invention. In the depicted embodiment, the SBG 100 comprises a cylindrical enclosure 102 having a pair of leads 104 protruding from the enclosure 102. Upon being sufficiently accelerated, energy generated by the SBG 100 is available on the leads 104 to power external electronics (not shown). In one embodiment, the generated energy may be stored in the external electronics for use by application hardware, e.g., fuzing or guidance electronics. The embodiment of FIG. 5, described in detail below, depicts exemplary external electronics comprising at least one capacitor for storing energy and at least one diode for controlling the flow of energy into the at least one capacitor and blocking that energy from flowing into the SBG after the SBG stops producing energy.

Figure 2:
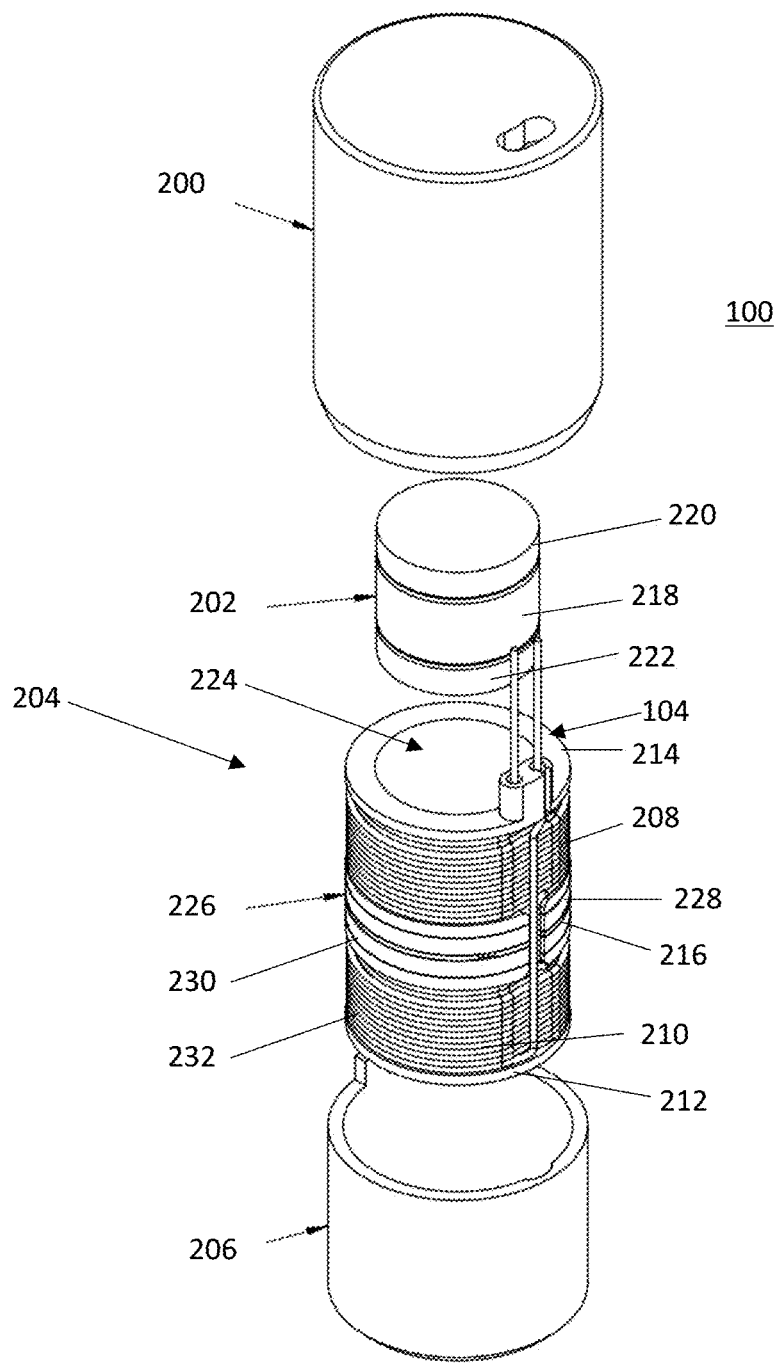
FIG. 2 depicts an exploded view of the SBG of FIG. 1.

FIG. 2 depicts an exploded view of the SBG 100 of FIG. 1. The enclosure 102 comprises an upper portion 200 and a lower portion 206, where the upper and lower portions 200 and 206 are each a cylinder with a closed end. The lower portion 206 has a diameter that is slightly smaller than the diameter of the upper portion 200 such that the lower portion 206 fits into the upper portion 200 to form the enclosure 102 of FIG. 1. Within an open region defined by the enclosure 102 is a coil assembly 204, a retainer assembly 226 and a magnet assembly 202.

The magnet assembly 202 comprises a magnet 218 that is sandwiched between two flux discs 220 and 222. In one embodiment, the flux discs 220 and 222 are puck shaped and fabricated from, for example, Carpenter Stainless Steel Type 430F or a comparable material. The magnet 218 is also puck shaped with a diameter of about 0.25 inches (0.635 cm) and can be fabricated from any number of magnetic materials that provide high flux densities, e.g., greater than 10,000 G. Such materials include, but are not limited to, neodymium and/or AlNiCo. Such magnets are available, for example, from Carpenter as models SBGv3, SS430F, and HiperCo50A.

The coil assembly 204 comprises a first coil 208 and a second coil 210 that are wound on their respective bobbins 214 (upper) and 212 (lower). In one embodiment, the coils are connected in series and, in another embodiment, the coils are connected in parallel. The wire on the coils can be counter wound on each bobbin or would in the same direction. A magnet retainer 216 (e.g., a shear disc) is positioned between the bobbins 212 and 214 to hold the magnet assembly in a first position until a sufficiently forceful acceleration event causes the retainer 216 to release the magnet assembly 202. The bobbins 212 and 214 define a longitudinal central passage 224 (along a central axis of the coil assembly) through which the magnet assembly 202 can pass. The bobbins 212 and 214 are wound with wire 232. In one embodiment, the wire is 30 AWG copper wire and 40 turns are used on each coil 208 and 210. In other embodiments, other gauges, wire materials and number of turns may be used. Additionally, the number of turns on each coil 208 and 210 do not have to be the same.

In one embodiment, the retainer assembly 226 comprises the retainer 216 sandwiched between a pair of annular flux rings 228 (upper) and 230 (lower). One embodiment of the retainer 216 shall be described in more detail below with respect to FIG. 3. The annular flux rings are fabricated from, for example, Carpenter Stainless Steel Type 430F or a comparable material.

In another embodiment, the magnet assembly 202 may be retained at the first position by a magnetic force of the magnet assembly 202 coupling to the upper portion 200. In such an embodiment, a physical retainer 216 is not necessary.

Figure 3:
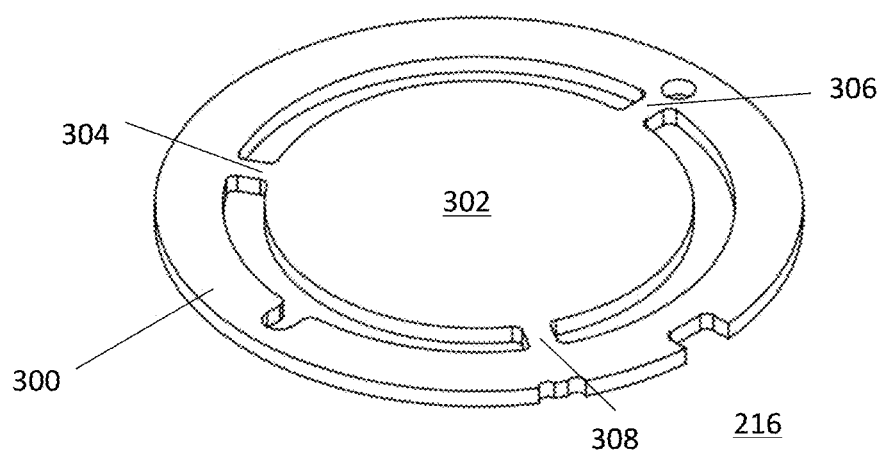
FIG. 3 depicts an embodiment of the retainer in the form of a shear disc.

FIG. 3 depicts an embodiment of the retainer 216 to provide a physical retention, e.g., a shear disc. The exemplary embodiment of the retainer 216 comprises an annulus 300 and a center support 302 that is supported in the center of the annulus by a plurality of supports 304, 306 and 308 that each extend between the annulus 300 and the center support 302. In operation, the magnet assembly 202 rests upon the center support 302 and, upon an acceleration event, the supports 304, 306 and 308 will shear and allow the magnet assembly 202 to move through the annulus 300. The retainer 216 is typically fabricated from a magnetic material such as annealed permalloy 80. At least one of the characteristics (e.g., thickness, material and width) of the supports 304, 306 and 308 define a minimum amount of acceleration that will allow the magnet assembly to move through the coils. Those skilled in the art will understand that various embodiments of the invention may utilize other forms of physical retention that will retain the magnet assembly and facilitate movement of the magnet upon occurrence of an acceleration event.

Figure 4:
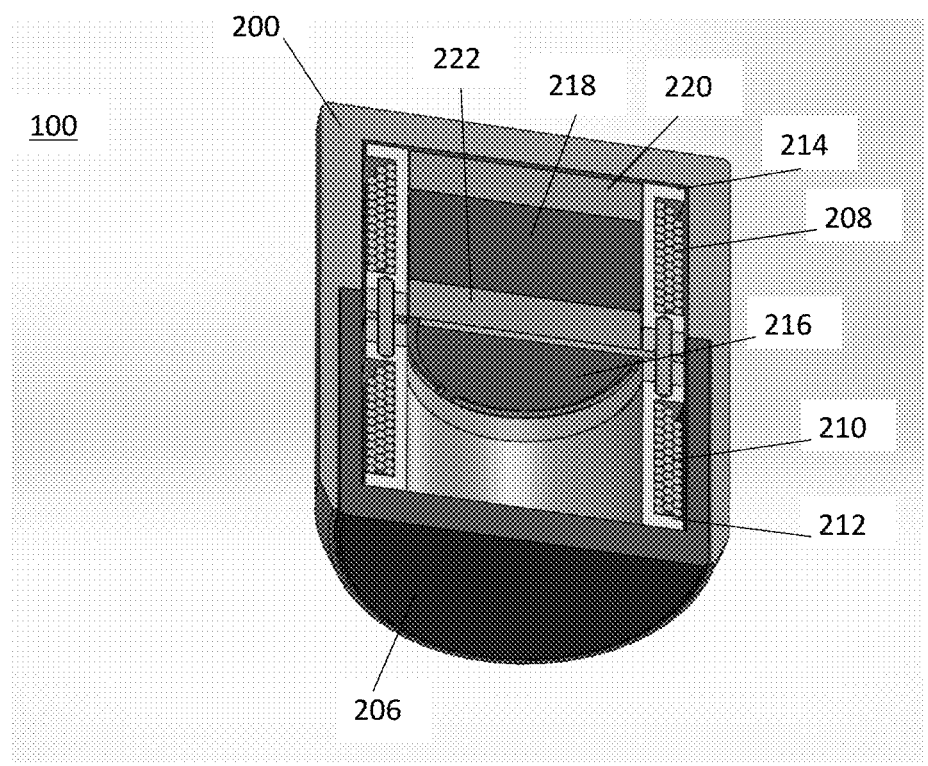
FIG. 4 depicts a cross-sectional view of the SBG of FIG. 1.

FIG. 4 depicts a cross-sectional view of SBG 100 of FIG. 1. The upper and lower portions 200 and 206 are roll crimped to define an enclosure within which the various assemblies are arranged. The magnet assembly 202 (the stack of flux discs 220 and 222 and magnet 218) is positioned to have the lower flux disc 222 resting upon the center portion of the retainer 216. The retainer 216 maintain the magnet assembly 202 in a first position, i.e., circumscribed by the upper bobbin 214 and its upper coil 208. Upon the influence of an acceleration event, the retainer 216 releases the magnet assembly 202 such that the magnet assembly 202 moves from the first position to a second position, i.e., circumscribed by the lower bobbin 212 and its lower coil 210. Through induction, the kinetic energy of the moving magnet is transformed into electrical energy at the output terminals of the coil pair 208 and 210.

Figure 5:
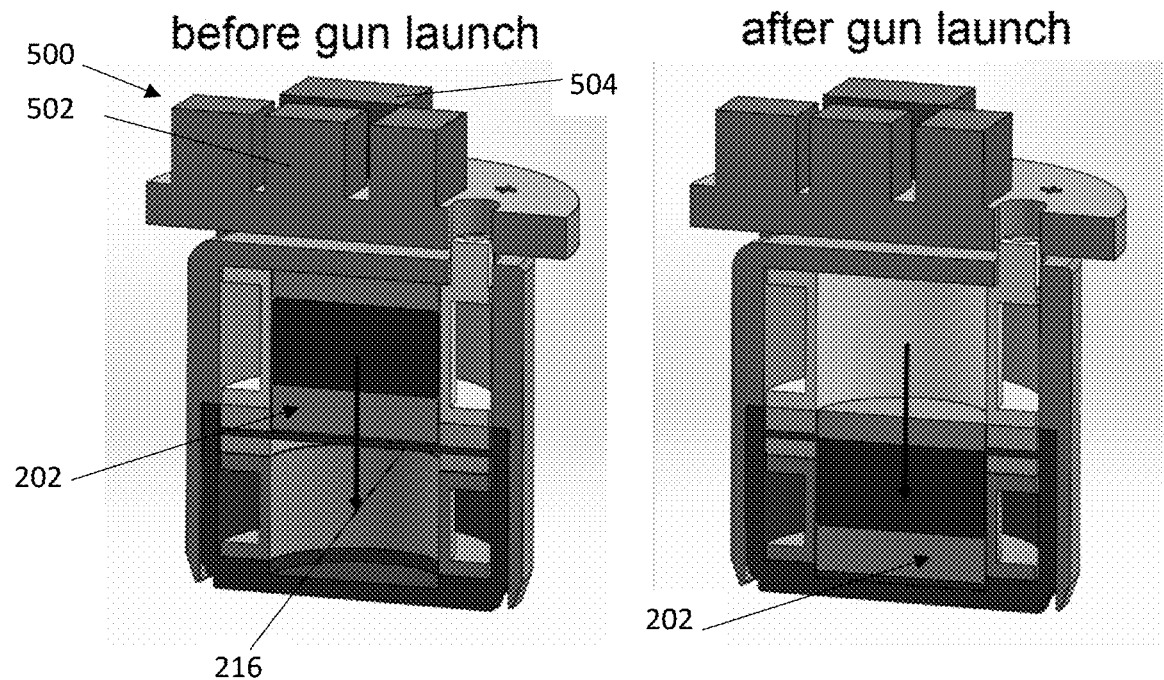
FIG. 5 contains two views (FIGS. 5A and 5B) of a cross sectional view of an SBG embodiment, where
Figure 5:
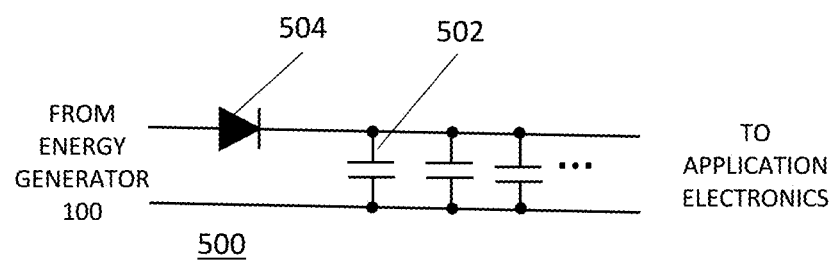

FIG. 5 contains two views (FIGS. 5A and 5B) of a cross-sectional view of the SBG 100, where FIG. 5A depicts the magnet assembly 202 retained in the first position and FIG. 5B depicts the magnet assembly located in the second position. The movement of the magnet assembly 202 from the first position to the second position (in the direction of the arrow representing movement parallel to the central axis of the SBG) generates a moving magnetic flux that induces a current in the coils which produces energy at the coil assembly output terminals. The flux rings guide the upper and lower magnetic loops such that they are isolated from each other depending on the magnets initial or final displaced position.

The output terminals are coupled to external electronics 500 comprising at least one capacitor 502 (generally arranged as a capacitor bank) and at least one diode 504. The at least one diode 504 controls the flow of energy into the capacitor(s) 502 to ensure that, once the acceleration event has moved the magnet, the energy in the capacitors will not flow into the coils 208 and 210 (not shown in FIG. 5). FIG. 5C depicts a schematic diagram of the external electronics 500 for storing energy produced by the energy generator 100. In one embodiment, the diode 504 is connected in series with the generator 100 and the capacitor(s) 502 are connected in parallel. In an alternative embodiment, a second diode (not shown in FIG. 5C) may be connected in the second wire from the generator 100.

Figure 6:
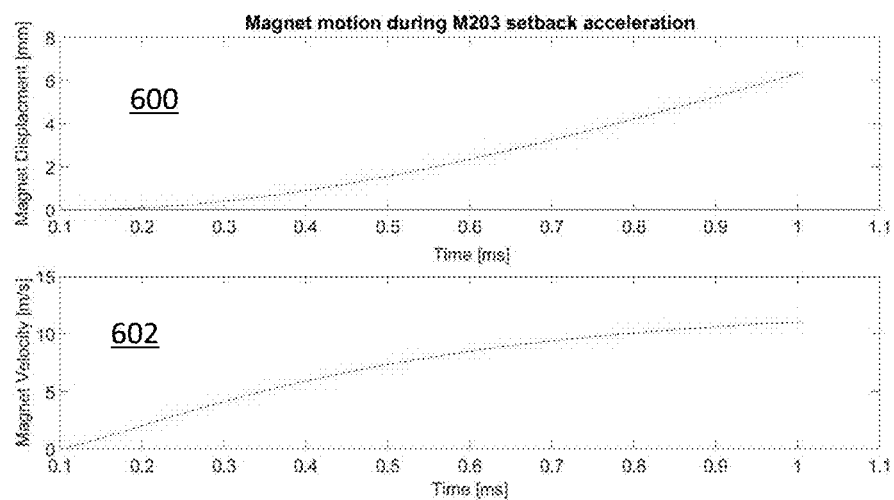
FIG. 6 depicts graphs of the magnet's displacement and velocity as a function of time.

The retainer 216 ensures that if the SBG is physically dropped the magnet will not displace. Thus, any corresponding electronics connected to the SBG will not become powered from an accidental dropping of the SBG. The second use for the retainer 216 is to guide the magnetic flux to an upper magnetic flux loop. The third reason for using a retainer is that the retainer is designed to rupture at a given threshold. Rupturing at a given threshold increases the magnet's velocity from the first position in comparison to the condition where the magnet is initially free to move without a retainer. The faster the magnet moves out of the first (upper) coil results in a larger corresponding electromotive force (emf) voltage spike. This effect is governed by Faraday's Law in Equation (1).

$$V_{emf} = -\frac{d\Phi}{dt} = -NA\frac{dB}{dx}\frac{dx}{dt} = -NA\frac{dB}{dx}v_{mag} \quad (1)$$

where,
Φ=magnetic flux
N=number of turns in coil
A=magnet cross section area
B=magnetic flux density
$v_{mag}$=magnet velocity In an optimization simulation, the magnet assembly was programmed to release at 0.1 ms after the start of the acceleration event. A 0.1 ms release corresponds to a fixing mechanism rupturing at about 20,000 g's (1 g is equal to 9.8 m/s^2) for an Mk19 platform and 8,000 g's for an M203 platform. The static load required to shear the retainer was determined with a load press to be 11.8 kg. This roughly equates to ~8,000 g's for a magnet assembly weight of 1.4 grams. FIG. 6 depicts graphs of the magnet's displacement (graph 600) and velocity (graph 602) as a function of time. In this embodiment, the magnet assembly is moving for about 0.4 ms. The 0.4 ms duration captures the majority of the setback energy and results in the magnet assembly having the fastest upper coil exiting velocity.

Figure 7:
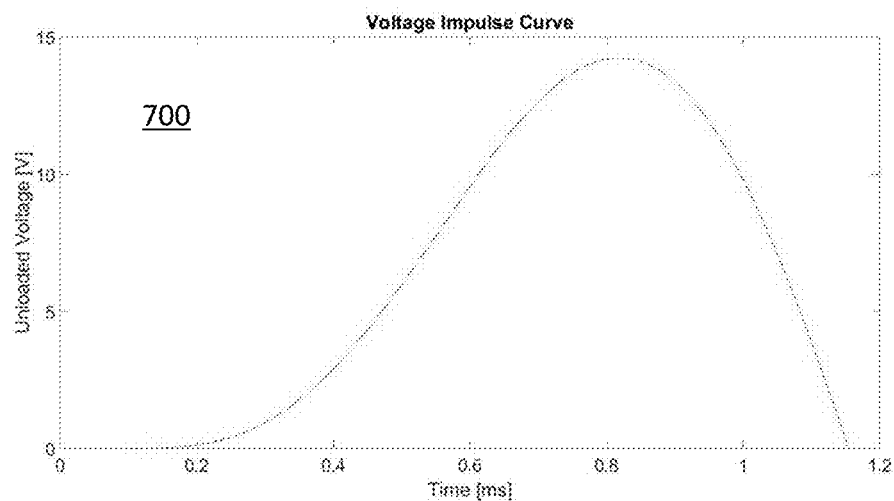
FIG. 7 depicts a graph of open circuit impulse voltage vs time as modeled to be produced by an embodiment of the present invention.

Using Equation (1) and multiplying by the velocity of the magnet assembly results in an impulse open circuit voltage produced by the coil assembly. FIG. 7 depicts a graph 700 of an exemplary impulse voltage produced from a 0.25 inch diameter magnet assembly displacing through two coils counter wound with a 30 AWG wire with 80 turns total. For this simulation, the coils are independent and coupled together in parallel.

Figure 8:
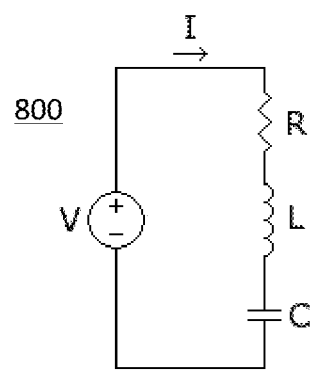
FIG. 8 depicts a circuit model used to predict output energy generated by embodiments of the invention.

The open circuit impulse voltage graph 700 of FIG. 7 can be applied as an input voltage to the circuit 800 shown in FIG. 8. Here, the real resistance of the coil assembly is R, the coil assembly's inductance is L, and the corresponding energy storage capacitance is denoted as C Note, because the magnet assembly is being displaced from the upper coil, the coil assembly inductance will change by a small percentage. This effect is quantified in Equation (2). Summing the voltage around circuit 800 in FIG. 8 (Kirchoff's voltage law) produces Equation (2). Substituting (1) and (3) into (2) produces Equation (4). Equation (4) is a second order nonlinear differential equation that is numerically solved.

$$\frac{d}{dt}[L_c(t)i(t)] + Ri(t) + \frac{1}{C}\int_{-\infty}^{t} i(\tau) = V_{emf}(t) \quad (2)$$

$$i(t) = \frac{dq(t)}{dt} \quad (3)$$

$$L_c\frac{d^2q(t)}{dt^2} + \frac{dL_c}{dt}\frac{dq(t)}{dt} + R_c\frac{dq(t)}{dt} + \frac{1}{C}q(t) = -NA\frac{dB}{dx}v_{mag} \quad (4)$$

$L_c$=setback generator inductance
$R_c$=coil resistance
C=circuit capacitance

Since the coil and circuit are consider weekly coupled, the coil's back electromotive force magnitude relative to the gun launch acceleration is minute. Therefore, the voltage input into Equation 2 is the open circuit, unloaded scenario when the magnet is displacing through the coil assembly. The setback generator inductance is measured as a function of the magnet assembly displacing through the setback generator. A ½ Hann window with a 2-5% increase in inductance was used to model the small inductance change as the magnet assembly displaces. The coil resistance R is a design variable that changes depending on the coil AWG and number of windings. Circuit capacitance C was also a variable that was simulated from 0-250 pfarad for each coil AWG, magnet size, and number of turns. The change in magnetic flux density as the magnet assembly displaces through the coil assembly, $$\frac{dB}{dx},$$

was simulated in ANSYS® over ten different magnet assembly positions as it displaces through the coil assembly. The result of the simulation is the $V_{emf}$ graph of FIG. 7.

Figure 9:
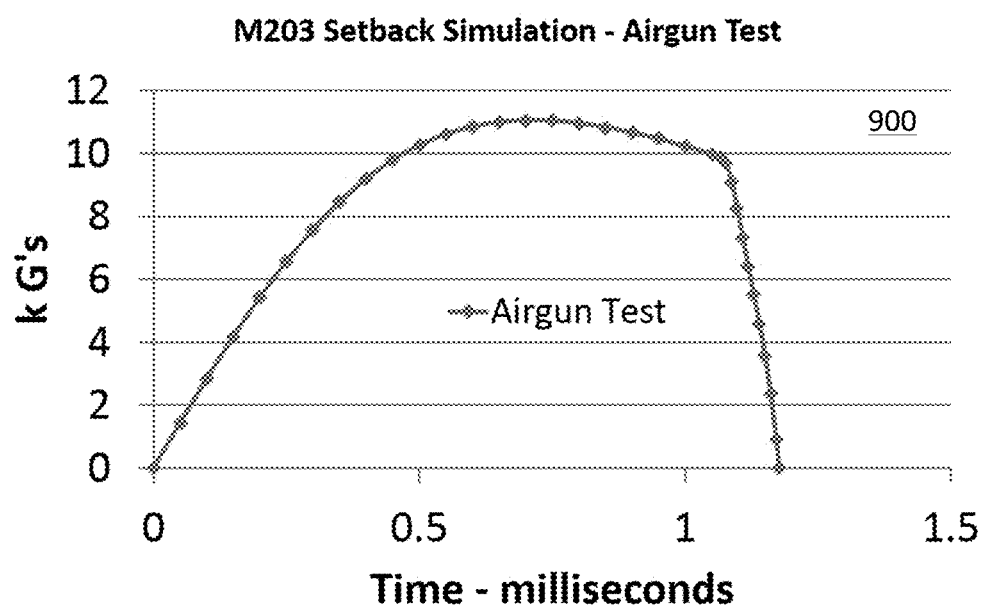
FIG. 9 depicts a graph of setback acceleration that is applied to an SBG embodiment in an airgun experiment.

To determine the efficacy of various embodiments of the invention, a series of three airgun experiments were undertaken to simulate a gun launch of the SBG. FIG. 9 is a graph 900 of setback acceleration (1,000 g's vs time) that was applied to the SBG via the airgun testing. This curve was designed to simulate the M203 cold fire setback acceleration.

Figure 10:
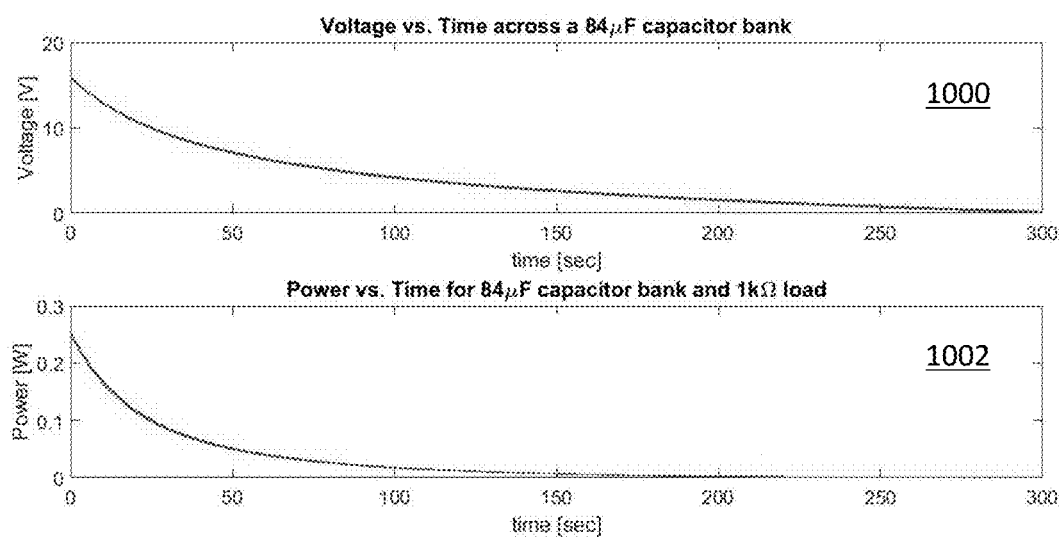
FIG. 10 depicts a graph of a capacitor bank charged to an initial voltage and discharged over a 1 kΩ load.

The airgun test validated the final design that was aimed to minimize SBG volume while maintaining a substantial energy output. The airgun experimental procedure is as follows:
load four setback generators into airgun carrier
verify that SBG electrical circuit has zero energy by measuring capacitor voltage, short capacitors if voltage is measureable
initiate timer when airgun is fired
quickly retrieve airgun bird and measure SBG circuit voltage and record with timestamp Resulting energy is ½ effective capacitance multiplied by the initial voltage squared at 80% charging efficiency. The initial voltage is determined by charging the SBG electrical circuit above the recorded airgun value and measuring the discharge rate. The initial voltage is then determined to be the discharge rate multiplied by the record timestamp plus the measured voltage. The resulting energy on the capacitors is multiplied by 0.8 since ceramic capacitors permittivity is not constant with voltage. FIG. 10 depicts a graph 1000 of a capacitor bank (84 µF) charged to an initial voltage and discharged over a 1 kΩ load. Graph 1002 depicts power vs time of the capacitor bank. Energy is the integral of the power curve and results show that 0.8 is an adequate factor for correcting the energy miscalculation due to non-linear change in permittivity when comparing to the energy value of ½ $CV^2$.

Table 1 lists the results from airgun testing for an embodiment of the SBG having a 0.5 inch diameter with the counter wound coils being wired in parallel (i.e., uncoupled, independent coils). Note that the dual coil embodiment exceeds the amount of energy produced in background art single coil SBGs, e.g., less than 5 mJ.

TABLE 1

| SBG wire | Electrical Circuit | | | SBG | |
|---|---|---|---|---|---|
| gauge | LCR Cap | Coil Ω | LCR Inductance | Voltage | Energy |
| 29AWG | 163.5 µF | 0.6276 | 43.8 µH | 10.6 | 7.4 mJ |
| 31AWG | 114 µF | 1.758 | 144.6 µH | 13.2 | 7.95 mJ |

Table 2 lists the results from airgun testing for an embodiment of the SBG having a 0.5 inch diameter with the counter wound coils being wired in series (i.e., coupled coils). Again note that the dual coil embodiment exceeds the amount of energy produced in background art single coil SBGs and produces an even greater amount of energy than the uncoupled, independent coil arrangement of the embodiment in Table 1.

TABLE 2

| SBG wire | Electrical Circuit | | | SBG | |
|---|---|---|---|---|---|
| gauge | LCR Cap | Coil Ω | LCR Inductance | Voltage | Energy |
| 31AWG | 104 µF | 1.768 | 56.9 µH | 17.64 | 13 mJ |
| 29AWG | 143.5 µF | 0.637 | 22.54 µH | 13.9 | 11.2 mJ |
| 30AWG | 177.5 µF | 1.190 | 35.85 µH | 10.5 | 7.8 mJ |
| 31AWG | 90.25 µF | 1.780 | 57.5 µH | 23.0 | 18.8 mJ |

An alternative SBG embodiment was targeted to meet a substantial energy output while minimizing the SBG volume. From the FEA and Matlab® simulation the diameter of the SBG was reduced from 0.5" to 0.442". The tradeoff between reducing the coil size versus reducing the magnet diameter was modeled and from simulation the exterior coil windings have a diminishing energy return due to their longer lengths per turn. This was weighed against decreasing magnet area while maintain or increasing coil turns. Since neodymium magnets are only commercially available in ⅟₁₆" increments, the final magnet assembly design remained at ¼" diameter while the coil outer diameter was reduced to accommodate the SBG reduced volume. Table 3 list the test results for this alternative embodiment.

TABLE 3

| SBG wire | Electrical Circuit | | | SBG | |
|---|---|---|---|---|---|
| gauge | LCR Cap | Coil Ω | LCR Inductance | Voltage | Energy |
| 30AWG | 118.5 µF | 0.710 | 32.7 µH | 14 | 8.7 mJ |
| 30AWG | 112.3 µF | 0.683 | 32.3 µH | 13.7 | 8.3 mJ |

Even the reduced volume embodiment of the invention produces a substantial amount of energy, i.e., over 8 mJ. As such, an SBG using dual counter wound coils is a viable energy source for electronics used in high acceleration environments.

When the foregoing is directed to embodiments of the present invention, other and further embodiments of the invention may be devised without departing from the basic scope thereof, and the scope thereof is determined by the claims that follow.

The invention claimed is:

1. Apparatus for generating energy comprising:
   a first coil and a second coil;
   a magnet assembly, when positioned in a first position is circumscribed by the first coil and, when positioned in a second position, is circumscribed by a second coil; and
   upon an acceleration even, allowing the magnet assembly to move to the second position, where the movement of the magnet assembly from the first position to the second position induces a current in the first and second coils and having a retainer wherein the retainer comprises an annulus and a center support, where a plurality of supports couple the annulus to the center support.

2. The apparatus of claim 1 wherein at least one characteristic of the plurality of the supports defines a minimum amount of acceleration that moves the magnet assembly from the first position to the second position.

* * * * *